June 28, 1927.
R. W. GOFF
1,633,812
ELECTROMAGNETIC OPERATING MEANS AND MOTOR CONTROLLER EMPLOYING THE SAME
Filed April 18, 1925     2 Sheets-Sheet 1
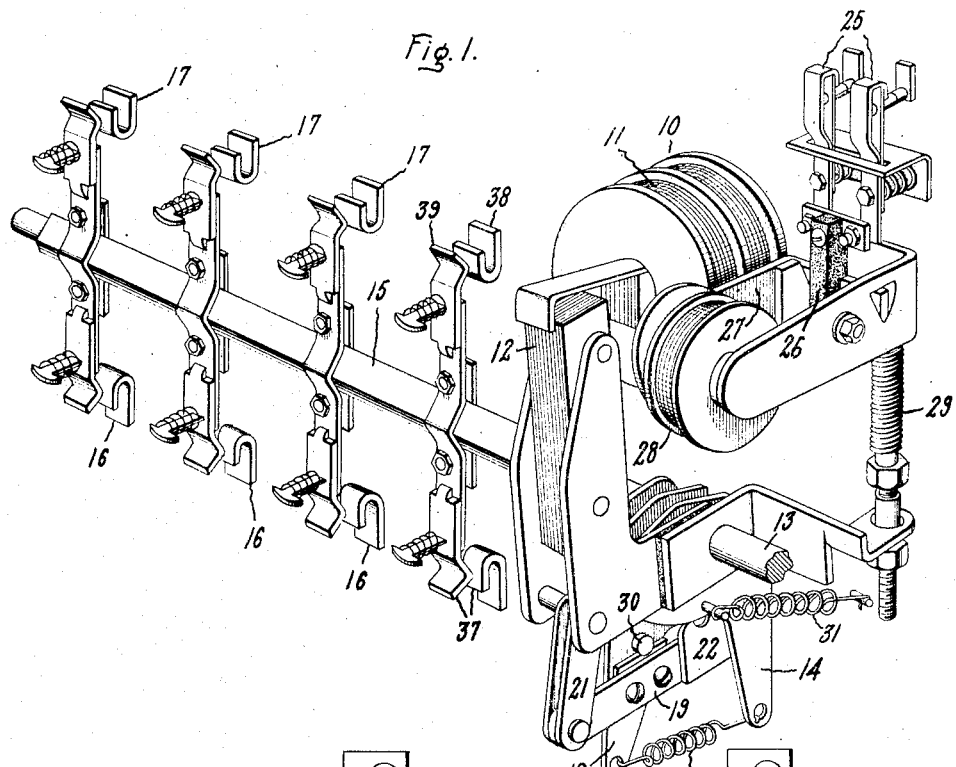
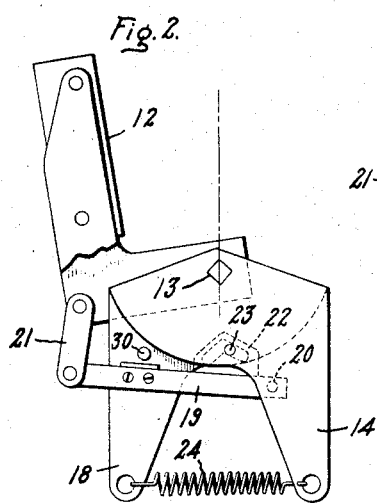
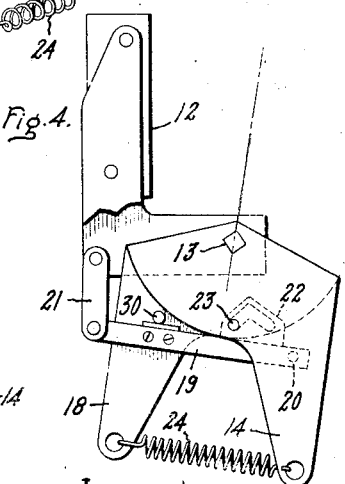
Inventor:
Robert W. Goff,
by *[signature]*
His Attorney.

June 28, 1927.
R. W. GOFF
1,633,812
ELECTROMAGNETIC OPERATING MEANS AND MOTOR CONTROLLER EMPLOYING THE SAME
Filed April 18, 1925
2 Sheets-Sheet 2

Inventor:
Robert W. Goff
by
His Attorney.

Patented June 28, 1927.

1,633,812

UNITED STATES PATENT OFFICE.

ROBERT W. GOFF, OF SCHENECTADY, NEW YORK, ASSIGNOR TO GENERAL ELECTRIC COMPANY, A CORPORATION OF NEW YORK.

ELECTROMAGNETIC OPERATING MEANS AND MOTOR CONTROLLER EMPLOYING THE SAME.

Application filed April 18, 1925. Serial No. 24,247.

My invention relates to an improved electromagnetic operating means for devices of various sorts which are intended to be operated from an initial or normal position to a final position through an intermediate position or a plurality of intermediate positions.

The improved operating means finds particular application in motor controllers for establishing the starting and then the running connections for the motor. As employed in a motor controller, the improved operating means of the invention is arranged to operate a switch contact mechanism from the initial or "off" position to establish the motor starting connections upon the initial energization of the operating electromagnet, the switch contact mechanism being thereupon put under a strain to establish the motor running connections. However, the contact mechanism is magnetically held in the starting position until a predetermined interval of time has elapsed or until a predetermined motor starting condition has occurred so that the strain on the contact mechanism which is set up during the establishment of the motor starting connections is not immediately effective. As soon as the predetermined interval of time has elapsed or when the predetermined motor starting condition has occurred, the strain on the contact mechanism is rendered effective to initiate the movement of the contact mechanism to establish the motor running connections upon a momentary reduction of the energization or a deenergization of the operating electromagnet, the completion of movement of the contact mechanism to the running position being effected by the reenergization of the operating electromagnet.

The starting of the motor and the establishment of the running connections is thus effected by simply energizing the electromagnet to initiate the operation of the switch contact mechanism, and the subsequent operations of the switch contact mechanism are automatically brought about without any attention on the part of the operator.

Figure 5:
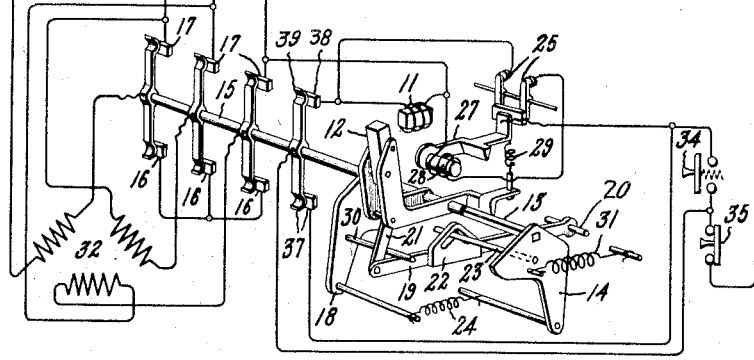
Figure 6:
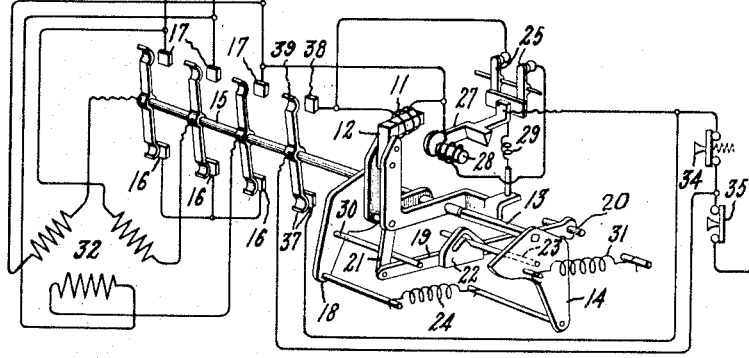
Figure 7:
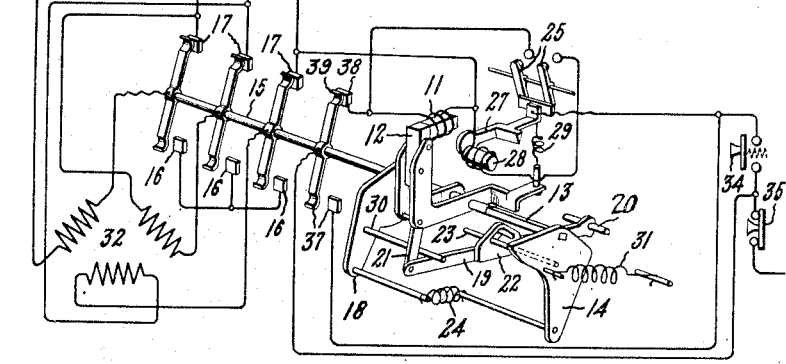

For a better understanding of the invention, reference is had to the accompanying drawings, which illustrate improved operating means in accordance with the invention and the employment of these improved operating means in a motor controller for establishing the starting and running connections for an electric motor. Fig. 1 is a perspective view of a motor controller in accordance with the invention; Figs. 2, 3 and 4 are details of the arrangement of Fig. 1 showing the relative positions of certain of the controlling parts of the operating mechanism in the initial or open position, the starting position and the running position, respectively. Figs. 5, 6 and 7 are simplified diagrams of a Y-delta starting arrangement for an alternating current electric motor employing the motor controller of Figs. 1 to 4, inclusive. Fig. 5 shows the relative positions of the various parts when the motor controller is in the "off" position, corresponding to Fig. 1. Fig. 6 is a similar view showing the relative positions of the various parts when the motor controller has been operated to establish the motor starting connections by connecting the motor windings in Y relation. Fig. 7 shows the relative positions of the various parts when the motor running connections have been established,— in this case the motor windings have been arranged in the familiar delta connection.

Referring to the drawings, particularly, Figs. 1 to 4 inclusive, the electromagnetic operating means comprises an electromagnet 10 having a winding 11 and a magnetic movable element or armature 12 which is mounted for rotation upon the shaft 13. The armature of the electromagnet is arranged to operate the member 14 which is secured to shaft 13. The extension 15 of shaft 13 carries a set of starting contacts 16 and a set of running contacts 17. The member 14 is arranged to be operated by the armature 12 through connections comprising the arm 18 pivotally mounted on the shaft 13 for rotation with respect thereto. The arm 18 is directly operated by means of the lever 19 which has one end pivotally mounted in a stationary support at 20, the other end being connected to the armature 12 through the link 21 so that the arm 18 is operated by the armature 12. The cam member 22 is carried by the lever 19 and a pin 23, which is carried by the operating member 14, cooperates with the cam so as to enforce a predetermined and desired sequence of operation of the member 14 and the switch contact mechanism controlled thereby.

The operating member 14 and the arm 18 are resiliently connected by means of the spring 24, this spring being put under a strain when the armature 12 is initially attracted to establish the motor starting connections, the strain of the spring being in the direction to operate the member 14 to establish the motor running connections as soon as the energization of the winding 11 of the electromagnet 10 is either temporarily reduced or deenergized. This spring initiates the movement of the contact mechanism to establish the motor running connections, the completion of the movement of the member 14 to establish the running connections being effected by the reenergization of the winding 11 of the electromagnet.

The energization of the winding 11 is automatically controlled in any suitable manner. I have indicated a time element device of the type disclosed and broadly claimed in the application of George E. Stack, Serial No. 636,456, filed May 3, 1923. This timing arrangement comprises auxiliary contact mechanism 25 for controlling the winding 11 of the electromagnet 10. The contact mechanism 25 is arranged to be operated by means of the insulating post 26 carried by the lever 27 of the timing arrangement. This lever 27 serves as an armature which cooperates with the electromagnet 28 and the arrangement is such that the armature is arranged to move step by step across the pole face of the electromagnet 28 as the armature is alternately attracted and released by the energizing current of the electromagnet 28. The armature 27 is put under a strain to open the auxiliary contacts 25 by means of the spring 29 which is interposed between the armature 27 of the auxiliary controlling electromagnet and the armature 12 of the main or operating electromagnet.

In general, the principle of operation of the arrangement, as shown in Figs. 1, 2, 3 and 4, is as follows: Assume that the parts are in their respective positions shown in Fig. 1, and that the winding 11 of the electromagnet 10 is energized through the auxiliary contacts 25 of the timing device. The armature 12 of the operating electromagnet will move to the attracted position, thus bringing the lever 19 into engagement with the pin 30 carried by the lever 18 and moving the lever 18 clockwise about the shaft 13. The operating member 14 is forced by means of the cam 22 and the pin 23 to move counter-clockwise against the strain of the spring 24. The strain of the spring 24 is in a direction to operate the member 14 to establish the motor running connections. The movement of the armature 12 to the attracted position places the spring 29 of the timing device under strain so that the armature of the timing electromagnet will skip over the pole face of the timing electromagnet 28, being alternately held and released as the energization of the winding of the electromagnet 28 is alternately energized and deenergized due to the alternations of an alternating current supply circuit.

After an interval of time the armature 27 of the timing electromagnet will have skipped over the pole face of the timing electromagnet and reached such a position that the post 26 will be brought into engagement with the auxiliary contacts 25, thus opening these contacts and momentarily deenergizing the winding 11 of the operating electromagnet. By reason of the fact that the armature 12 of the operating electromagnet has a substantial inertia effect, the spring 24 will be instantly effective to initiate the movement of the motor controller contact mechanism to establish the motor running connections, the pin 23 being forced backward in the cam slot of the cam member 22 until this pin is past the peak of the cam slot. Upon a reenergization of the winding 11 of the electromagnet, the armature 12 will be again attracted and by reason of the fact that the cam member 22 has now changed its position, the pin 23 will be forced down the left-hand cam slot, thus drawing the operating member 14 towards the arm 18 and moving these members as a unit. The parts will now be in their respective positions as indicated in Fig. 4.

The switch contact mechanism 17 is thus operated to establish the running connections of the motor. These running connections are maintained as long as the winding 11 of the operating electromagnet is maintained energized. When the winding 11 is deenergized, the switch contact mechanism returns to the position indicated in Fig. 1, by reason of the fact that the spring 31, which is connected to the arm 14, is put under a strain when the arm 14 is operated to establish the running connections of the motor. The strain of this spring is effective to return the arm to its initial position when the holding effect of the armature 12 is released.

Figs. 5, 6 and 7 show very diagrammatically a motor control system embodying the motor controller of the invention. In Fig. 5 the motor controller is in the "off" position, the motor 32 being disconnected from the three phase supply circuit 33. It is believed that with an understanding of the features of construction and the principles of operation of the motor controller illustrated in Figs. 1 to 4, inclusive, a quick understanding of this motor control system will be had from an explanation of the operation thereof. In order to start the electric motor 32, the start push button 34 will be closed, thereby energizing the coil 11 of the operating electromagnet through a circuit from the middle supply conductor, the stop push button 35, start push button 34, left-hand contact of the timing relay contacts 25, coil 11 to the lower supply conductor. The winding 28 of the timing electromagnet will also be energized through the right-hand contact of the timing relay.

The armature 12 of the operating electromagnet will be attracted, thereby raising the lever 19 and tilting the cam 22 and moving this cam clockwise about the pivotal support 20 of the lever 19. After the lever 19 has moved a slight distance about its pivotal support, the pin 30 on the lever 18 is engaged, thereby moving this lever in the clockwise direction about the shaft 13. The movement of the pin 23 carried by the arm 14 in the right-hand slot of the cam plate 22 causes the arm 14 to move in the counter clockwise direction against the strain of the spring 24. This counter clockwise movement of the arm 14 moves the lower contacts on the extension 15 of shaft 13 to make engagement with their corresponding stationary contacts. The windings of the motor are thus connected in Y relation for starting and the contacts of the start push button 34 are short circuited through the contacts 37 of the controller so that the start push button may be released and the winding 11 of the operating electromagnet will be maintained energized as well as the windings 28 of the timing relay. The parts will now be in their respective positions shown in Fig. 6.

The armature 27 of the timing relay will be put under a strain to move clockwise about its pivotal support, but this armature is alternately mechanically held and released so that the armature proceeds in a step by step manner across the pole face of the core on which the winding 28 is wound. After a predetermined interval of time, the armature will move to such a position that the time relay contacts 25 will be moved about their pivotal support so as to open the connection of the winding 11 of the operating electromagnet and the winding 28 of the timing relay from the source of supply. The momentary deenergization of the winding 11 releases the holding effect of the armature 12 on the cam plate 22 and moves this cam plate a short distance in the counter-clockwise direction about the pivotal support 20 for the lever 19. The strain set up in the spring 24 during the establishment of the motor starting connections is now effective to quickly operate the arm 14 in a clockwise direction, thus opening the motor starting connections and the short circuit about the contacts of the start push button and bringing the upper set of controller contacts adjacent their respective stationary contacts. The stationary contact 38 is advanced slightly from the other stationary contacts so that the movable contact 39 will be brought into engagement with the contact 38, thus energizing the winding 11 of the operating electromagnet through a circuit from the middle supply conductor, the stop button 35, movable contact 39, stationary contact 38, winding 11, to the lower supply conductor. This establishes an energizing circuit for the operating electromagnet which is independent of the start push button 34 and the contacts of the timing relay. The armature 12 of the operating electromagnet has an appreciable inertia, and by reason of the fact that the strain set up in the spring 24 is immediately effective to throw the controller shaft 13 from the starting position to the running position, the action of the controller in shifting from the starting to the running contacts is very quickly accomplished so that there is only a momentary deenergization of the winding of the operating electromagnet. The changeover from the motor starting connections to the motor running connections is accomplished in what amounts to a snap action, since upon the reenergization of the operating electromagnet, the armature 12 will be again attracted and the movement of the controller shaft 13 to the running position will be completed by the return movement of the armature 12. The parts will now be in their respective positions, as indicated in Fig. 7, and the motor windings will be connected in delta relation—the running connections for the motor.

It will be understood that when the winding 11 of the operating electromagnet is deenergized to prompt the initiation of the movement of the controller to establish the running connections, that the pin 23 is forced quickly upward in its cam slot until the pin has been thrown to the uppermost position in this slot. The reenergization of the winding of the electromagnet is brought about at this time so that upon the return movement of the armature 12 of the operating electromagnet and the consequent movement of the cam plate 22 about the pivotal support 36, the pin 23 will be forced down the left-hand cam slot, thus in turn forcing the arm 14 to move in the clockwise direction instead of moving in the counterclockwise direction as was the case upon the initial energization of the operating electromagnet. The spring 31 is put under a strain with the controller in the running position so that should there be a failure of voltage, the strain of this spring is present to return the various parts of the controller to their respective positions indicated in Fig. 5, and establish the open position of the controller.

The motor may be "jogged" in this way.

Assume that the parts are in their respective positions, as indicated in Fig. 5. If the start push button 34 is closed, the motor starting connections will be established in the manner previously explained. If the stop push button 35 is depressed before the timing relay has an opportunity to function, the spring 24 is effective to throw the controller shaft toward the running position and the movable contact 39 will come into engagement with the stationary contact 38. However, since the coil circuit of the operating electromagnet is opened at the contacts of the stop push button 35, the winding of the operating electromagnet will not be reenergized to complete the movement of the controller shaft to establish the motor running connections so that the controller shaft will then return to the position indicated in Fig. 5. The pin 23 will return through the same path in the cam slot so that the various parts of the controller will be in their respective positions indicated in Fig. 5, ready to effect another starting or jogging operation of the motor.

What I claim as new and desire to secure by Letters Patent of the United States, is:—

1. Operating means for a device having a normal and two operative positions comprising an operating member, an electromagnet having a magnetic movable element for operating the said member, and means comprising a resilient connection interposed between said member and said element through which, upon the initial energization of said electromagnet, the said member is operated from the normal position to the first operative position and is held therein with the member put under a strain to the second operative position which becomes effective to initiate the operation of the member to the second position upon a momentary deenergization of said electromagnet and through which the said electromagnet completes the movement of the member to the second position upon a reenergization of the electromagnet.

2. Operating means for a device having two operative positions and biased to a mid position between the operative positions, comprising a shaft, an electromagnet having a magnetic movable element, an operating member for said shaft, and a resilient connection including a cam between the said member and said element through which the shaft is moved from the mid position to the first of said positions to be magnetically held therein by the said element and be put under a strain which becomes effective to throw the shaft toward the second operative position upon a momentary deenergization of the electromagnet.

3. Operating means for a device having a neutral position and two operative positions, comprising a shaft, an electromagnet having a magnetic movable element, a member connected to said shaft for operating the same, and a resilient connection including a cam interposed between said member and said element through which the shaft is moved from the neutral position to the first operative position to be magnetically held therein by said electromagnet with the shaft put under a strain to the second position which becomes effective to initiate the operation of the shaft to the second position upon a momentary deenergization of the said electromagnet and through which the said element completes the movement of the shaft to the second position upon a reenergization of the electromagnet.

4. Operating means for a device having a neutral position and two operative positions, comprising a shaft, an electromagnet having a magnetic movable element, a member connected to said shaft for operating the same, and a resilient connection including a cam interposed between said member and said element through which, upon the initial energization of said electromagnet, the shaft is moved by the electromagnet from the neutral position to the first operative position with the shaft put under a strain to the second position which becomes effective to initiate the operation of the shaft toward the second position upon a momentary deenergization of said electromagnet and through which the said element completes the movement of the shaft to the second position upon a reenergization of the electromagnet.

5. A motor controller comprising contact mechanism for establishing starting and running connections for the motor, an electromagnet having a magnetic movable element for operating the said contact mechanism from the off to the starting position and from the starting to the running position, and a resilient connection between the said contact mechanism and said element including a controlling member which forces a predetermined sequence of operation of the contact mechanism, whereby upon the initial energization of the said electromagnet the said element moves the said contact mechanism from the off to the starting position and places the contact mechanism under a strain to the running position which becomes effective to initiate the operation of the contact mechanism to the running position upon a momentary denergization of said electromagnet, the said controlling member thereupon cooperating to cause the contact mechanism to move to the running position upon a reenergization of the electromagnet.

6. A motor controller comprising contact mechanism for establishing motor starting and running connections, an electromagnet having a magnetic movable element for operating the said contact mechanism, a spring interposed between the said contact mechanism and said element, and a cam for forcing a definite sequence of operation of the contact mechanism, whereby upon the initial energization of said electromagnet the said element moves to the attracted position, the contact mechanism is moved thereby to establish the motor starting connections, and the said spring is placed under a strain to move the contact mechanism to the running position which becomes effective through said cam and in response to a momentary deenergization of said electromagnet, to initiate the movement of contact mechanism to establish the running connections, the completion of the movement of the contact mechanism to establish the running connections being effected by said element through said cam upon the reenergization of the electromagnet.

7. A motor controller comprising a switch shaft operable each way from a neutral position to an operative position, an electromagnet having a magnetic movable element pivotally mounted on the said shaft for movement with respect thereto, an operating member secured to said shaft for operating the same, a second member pivotally mounted on the said shaft for movement with respect thereto, a spring interposed between the said members, a cam, and link mechanism connected to said magnetic movable element for operating the said cam and said members to move the said shaft from the neutral position to the first operative position and put the said spring under strain to move the shaft to the second operative position upon the initial energization of said electromagnet, the strain of said spring being effective to initiate the movement of the said shaft toward the second operative position upon a temporary deenergization of said electromagnet and the said element being effective to complete the movement of the shaft to said second position upon a reenergization of the electromagnet.

In witness whereof, I have hereunto set my hand this 17th day of April, 1925.

ROBERT W. GOFF.

Certificate of Correction.

Patent No. 1,633,812.     Granted June 28, 1927, to

ROBERT W. GOFF.

It is hereby certified that error appears in the printed specification of the above-numbered patent requiring correction as follows: Page 1, line 15, after the word " or " insert the article *the;* page 3, line 9, after the word " right " insert the word *hand;* and that the said Letters Patent should be read with these corrections therein that the same may conform to the record of the case in the Patent Office.

Signed and sealed this 16th day of August, A. D. 1927.

[SEAL.]

M. J. MOORE,
*Acting Commissioner of Patents.*